(12) United States Patent
Hayashi

(10) Patent No.: US 7,660,055 B2
(45) Date of Patent: Feb. 9, 2010

(54) OPTICAL ELEMENT AND OPTICAL ELEMENT HOLDER

(75) Inventor: Hisayoshi Hayashi, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 12/151,231

(22) Filed: May 5, 2008

(65) Prior Publication Data
US 2008/0212210 A1    Sep. 4, 2008

Related U.S. Application Data

(62) Division of application No. 11/366,051, filed on Mar. 1, 2006, now Pat. No. 7,391,955.

(30) Foreign Application Priority Data

Mar. 11, 2005 (JP) ............................. 2005-069340

(51) Int. Cl.
*G02B 7/02* (2006.01)
(52) U.S. Cl. ......................... 359/822; 359/694; 359/813
(58) Field of Classification Search ................... 359/822
See application file for complete search history.

(56) References Cited

U.S. PATENT DOCUMENTS

| | | | | |
|---|---|---|---|---|
| 4,193,667 A | * | 3/1980 | Yasukuni et al. ............. 359/688 |
| 5,196,963 A | * | 3/1993 | Sato et al. .................... 359/699 |
| 6,236,523 B1 | * | 5/2001 | Iikawa et al. ................. 359/826 |
| 7,079,332 B2 | * | 7/2006 | Tanaka ......................... 359/822 |
| 7,230,773 B2 | * | 6/2007 | Nomura et al. ............. 359/696 |
| 7,420,748 B2 | * | 9/2008 | Koyama ....................... 359/703 |

FOREIGN PATENT DOCUMENTS

JP    60-234243    11/1985

* cited by examiner

*Primary Examiner*—Jessica T Stultz
(74) *Attorney, Agent, or Firm*—William L. Androlia; H. Henry Koda

(57) ABSTRACT

An optical element including a first groove extending from first end of the outer peripheral face in an optical axis direction towards second end, and a second groove connected to the first groove and extending from second end of the outer peripheral face in the optical axis direction towards first end; and a position-adjusting concave part which is between the first and second grooves and adjusts positions by adjusting member in the optical axis direction, a revolving direction about the optical axis, a width direction of first and second grooves, which is orthogonal to the optical axis, and in a synthesized direction that is a combination of at least two of those directions, wherein the optical element is molded by using only a first molding die for molding a part on the first groove side and a second molding die for molding a part on the second groove side.

1 Claim, 6 Drawing Sheets

OPTICAL ELEMENT AND OPTICAL ELEMENT HOLDER

This is a Divisional Application of application Ser. No. 11/366,051 filed Mar. 1, 2006, now U.S. Pat. No. 7,391,955, which is hereby incorporated in its entirety by reference.

BACKGROUND OF THE INVENTION

1. Field of the Invention

The present invention relates to an optical element and an optical element holder and, more particularly, to an optical element and an optical element holder with which position adjustment of the optical element can be preferably carried out.

2. Description of the Related Art

Conventionally, in an optical pickup device, a light-receiving element receives light that is emitted from a light source, irradiated to an optical disk and reflected thereby.

In such optical pickup device, conventionally, there have been a sensor lens provided at an incident-side position of the light-receiving element and a diffraction grating provided at an emission-side position of the light source.

The sensor lens has a function of giving astigmatism to the reflected light from the optical disk and of condensing the reflected light towards the light-receiving element. The diffraction grating has a function of converting and emitting the light emitted from the light source into three beams for tracking.

FIG. 10 and FIG. 11 illustrate an example of such sensor lens to be mounted on the optical pickup device. This sensor lens 1 is constituted of a lens main body 5 having two lens faces 2, 3, i.e. a first lens face 2 (cylindrical face) and a second lens face 3, and a cylindrical-shape holder 6 for holding the lens main body 5 from the outer side.

The lens main body 5 and the holder 6 are integrally molded by injection-molding of a resin material using a molding die.

Further, as shown in FIG. 10 and FIG. 11, on the outer-peripheral face of the holder 6, a position-adjusting concave part 7 with a square plane shape for adjusting the position of the sensor lens 1 is formed by caving into an optical axis 8 side.

The position-adjusting concave part 7 is capable of having an adjusting pin (not shown) inserted from the top end. In the state where the adjusting pin is inserted to the position-aligning concave part 7, the adjusting pin is moved in the optical axis 8 direction or rotated in the revolving direction with the optical axis 8 being the center, for example. With this, it is possible to adjust the position of the sensor lens 1 in the optical axis 8 direction, the revolving direction, etc.

For mounting such sensor lens 1 on the optical pickup device, the above-described position adjustment of the sensor lens 1 is performed on a frame of the optical pickup device and then the sensor lens 1 is fixed on the frame by means of an adhesive or the like, so that the reflected light from the optical disk can be appropriately guided to a light-receiving part of the light-receiving element.

The optical pickup device in which the position adjustment of the sensor lens 1 has been done can appropriately exhibit a desired function of the sensor lens 1. Therefore, it is possible to read out information, recorded on the optical disk and to write information on the optical disk appropriately.

Although not shown, like the sensor lens 1, the diffraction grating has a cylindrical-shape holder molded integrally on the outer side of the diffraction grating main body for holding the diffraction grating main body, and the same position-adjusting concave part as that of the sensor lens 1 is formed on the outer-peripheral face of the holder.

Like the sensor lens 1, such diffraction grating is also fixed to a frame by means of an adhesive and the like after performing the position adjustment on the frame.

[Patent Literature] Japanese Patent Unexamined Publication 60-234243

Conventionally, for molding the square position-adjusting concave part 7 as show in FIG. 10 and FIG. 11 by injection molding, it is necessary to prepare a slide molding die 11 (a section framed by slanting lines in FIG. 11) that is slidable in the radius direction used for molding the position-adjusting concave part 7 in addition to a lower die 9 that is a movable molding die for molding the first lens face 2 and an upper die 10 that is a fixed-side molding die for molding the second lens face 3 as shown by an alternate long and short dash line in FIG. 11.

That is, with the structure of the conventional position-adjusting concave part 7, it is essential to use the slide molding die 11 for surely taking out the molded article from the molding die in both cases where the position-adjusting concave part 7 is molded in the lower die 9 and in the upper die 10.

Therefore, conventionally, the cost of the molding dies 9, 10, and 11 is increased, resulting in an increase in the manufacturing cost of the sensor lens 1 molded in the molding dies 9, 10, and 11.

Further, there increases the generation rate of mold defects of the sensor lens 1 such as flash caused by the slide molding die 11, thereby deteriorating the yield.

Furthermore, in the case where an automation machine constituting a mass-production line of the sensor lens 1 is initially adopted, the cost of such automation machine comprising such molding dies 9, 10, 11 naturally becomes high since the cost of the molding dies 9, 10, 11 is high.

Moreover, there is also developed such a problem when modifying a current automation machine that it requires a tremendous amount of equipment cost for modifying the automation machine.

In addition, there are a large number of molding dies 9, 10, 11 so that it also requires a large amount of cost for the maintenance of the automation machine.

These problems exist not only in the sensor lens 1 but also in other optical elements such as the diffraction grating with the position-adjusting concave part, and in the case where the position-adjusting concave part is molded in a holder for holding an optical element, which is formed separately from the optical element.

SUMMARY OF THE INVENTION

The present invention is designed in view of such various problems. The object of the present invention therefore is to provide an optical element and an optical element holder, which are capable of: reducing the total cost for molding the position-adjusting concave part, e.g. cost of dies, cost for initially adopting an automation machine, cost necessary for modification or maintenance; molding the position-adjusting concave part effectively; and also improving the yield.

In order to achieve the aforementioned object, the optical element according to a first aspect of the present invention is an optical element having a position-adjusting concave part on an outer peripheral face surrounding an optical axis, which is capable adjusting position by inserting an adjusting member into the position-adjusting concave part and shifting the adjusting member in that state. The optical element comprises: a first groove extending from one end of the outer peripheral face in an optical axis direction towards other end, and a second groove connected to the first groove, which extends from the other end of the outer peripheral face in the optical axis direction towards the one end; and the position-adjusting concave part formed in a connecting part between the first groove and the second groove, which is capable of adjusting position by the adjusting member in the optical axis direction, a revolving direction with the optical axis being a center, width direction of the first groove and the second groove, which is orthogonal to the optical axis, and in a synthesized direction that is a combination of at least two directions out of those directions, wherein the optical element can be molded by using only two molding dies of a first molding die for molding a part on the first groove side and a second molding die for molding a part on the second groove side.

In the first aspect of the present invention, there is provided the position-adjusting concave part in the connecting part between the first groove and the second groove. Thus, it is possible to mold the optical element having the position-adjusting concave part by using only two molding dies of the first molding die and the second molding die. In addition, the molded optical element (molded article) can be surely taken out from the molding die.

The optical element according to a second aspect is an optical element having a position-adjusting concave part that is caved towards an optical axis side on an outer peripheral face surrounding the optical axis, which is capable of adjusting position by inserting an adjusting member into the position-adjusting concave part and shifting the adjusting member in that state. The optical element comprises: a first groove extending from one end of the outer peripheral face in an optical axis direction towards other end, which has at least a first bottom face, a first side face formed in one end of the first bottom face in a width direction orthogonal to the optical axis direction, and a second side face formed in the other end of the first bottom face in the width direction; a second groove connected to the first groove, which extends from the other end of the outer peripheral face in the optical axis direction towards the one end, has at least a second bottom face, a third side face formed in one end of the second bottom face in the width direction, and a fourth side face formed in the other end of the second bottom face in the width direction; and the position-adjusting concave part formed in a connecting part between the first groove and the second groove, which is capable of adjusting position by the adjusting member in the optical axis direction, a revolving direction with the optical axis being a center, width direction of the first groove and the second groove, which is orthogonal to the optical axis, and in a synthesized direction that is a combination of at least two directions out of the directions, wherein: the first side face is formed at a position closer to one direction side in the width direction than the third side face; the third side face is formed at a position closer to the one direction side in the width direction than the second side face or at a same position as that of the second side face in the width direction; the second side face is formed at a position closer to the one direction side in the width direction than the fourth side face; the connecting part between the first groove and the second groove comprises at least: in a vicinity of the second groove in the first side face, a first abutting face to which the adjusting member can be placed against, which is formed in such a shape that a nodal line between either the outer peripheral face or the first bottom face becomes in parallel to the optical axis direction or in such a shape that it gradually becomes distant from the optical axis towards the one end of the outer peripheral face in the optical axis direction; at an end of the first abutting face on the second groove side or in an vicinity of the end, a second abutting face to which the adjusting member can be place against, which is formed in a such a shape that a nodal line between at least either the outer peripheral face or the first bottom face makes a prescribed angle with respect to the optical axis direction by being extended from the end towards a center side of the first groove in the width direction; in a vicinity of the first groove in the fourth side face, a third abutting face to which the adjusting member can be placed against, which is formed in such a shape that a nodal line between either the outer peripheral face or the second bottom face becomes in parallel to the optical axis direction or in such a shape that it gradually becomes distant from the optical axis towards the other end of the outer peripheral face in the optical axis direction; and at an end of the third abutting face on the first groove side or in an vicinity of the end, a fourth abutting face to which the adjusting member can be place against, which is formed in a such a shape that a nodal line between at least either the outer peripheral face or the second bottom face makes a prescribed angle with respect to the optical axis direction by being extended from the end towards a center side of the second groove in the width direction, wherein the first to fourth abutting faces constitute at least a part of side faces of the position-adjusting concave part.

In the second aspect of the present invention, there is provided in the connecting part between the first groove and the second groove the position-adjusting concave part in which at least a part of side faces is formed by the first to fourth abutting faces. Thus, the adjusting member can be selectively placed against each abutting face so that the position adjustment can be performed appropriately. In addition, it becomes possible to mold the optical element having the position-adjusting concave part by using only two molding dies of the first molding die and the second molding die. Further, the molded optical element can be surely taken out from the molding die.

Further, the optical element according to a third aspect is the optical element of the second aspect, wherein: the second abutting face is formed in such a shape that at least one of nodal lines between the outer peripheral face and the first bottom face is orthogonal to the optical axis direction; the fourth abutting face is formed in such a shape that at least one of nodal lines between the outer peripheral face and the second bottom face is orthogonal to the optical axis direction; and the position-adjusting concave part has a square or rectangular plane shape.

Further, the third aspect of the present invention allows the use of existing adjusting members. Moreover, the adjusting member can be appropriately placed against all the abutting faces so that position adjustment can be performed more easily with higher precision.

Furthermore, the optical element according to a fourth aspect is an optical element having a position-adjusting concave part that is caved towards an optical axis side on an outer peripheral face surrounding the optical axis, which is capable of adjusting position by inserting an adjusting member into the position-adjusting concave part and shifting the adjusting member in that state. The optical element comprises: a first groove extending from one end of the outer peripheral face in an optical axis direction towards other end, which has at least a first bottom face, a first side face formed in one end of the first bottom face in a width direction orthogonal to the optical axis direction, and a second side face formed in other end of the first bottom face in the width direction; a second groove connected to the first groove, which extends from the other end of the outer peripheral face in the optical axis direction towards the one end, has at least a second bottom face, a third side face formed in one end of the second bottom face in the width direction, and a fourth side face formed in other end of the second bottom face in the width direction; and the position-adjusting concave part formed in a connecting part between the first groove and the second groove, which is capable of adjusting position by the adjusting member in the optical axis direction, a revolving direction with the optical axis being a center, width direction of the first groove and the second groove, which is orthogonal to the optical axis, and in a synthesized direction that is a combination of at least two directions out of the directions, wherein: either the first side face and the third side face or the second side face and the fourth side face are formed at a same position in the width direction, or the first side face and the third side face as well as the second side face and the fourth side face are formed at a same position in the width direction; the connecting part between the first groove and the second groove comprises at least: in a vicinity of the second groove in the first side face, a first abutting face to which the adjusting member can be placed against, which is formed in such a shape that a nodal line between either the outer peripheral face or the first bottom face becomes in parallel to the optical axis direction or in such a shape that it gradually becomes distant from the optical axis towards the one end of the outer peripheral face in the optical axis direction; at an end of the first abutting face on the second groove side or in an vicinity of the end, a second abutting face to which the adjusting member can be place against, which is formed in a such a shape that a nodal line between at least either the outer peripheral face or the first bottom face makes a prescribed angle with respect to the optical axis direction by being extended from the end towards a center side of the first groove in the width direction; in a vicinity of the first groove in the fourth side face, a third abutting face to which the adjusting member can be placed against, which is formed in such a shape that a nodal line between either the outer peripheral face or the second bottom face becomes in parallel to the optical axis direction or in such a shape that it gradually becomes distant from the optical axis towards the other end of the outer peripheral face in the optical axis direction; and at an end of the third abutting face on the first groove side or in an vicinity of the end, a fourth abutting face to which the adjusting member can be place against, which is formed in a such a shape that a nodal line between at least either the outer peripheral face or the second bottom face makes a prescribed angle with respect to the optical axis direction by being extended from the end towards a center side of the second groove in the width direction, wherein the first to fourth abutting faces constitute at least a part of side faces of the position-adjusting concave part.

In the fourth aspect of the present invention, there is provided in the connecting part between the first groove and the second groove the position-adjusting concave part in which at least a part of side faces is formed by the first to fourth abutting faces. Thus, the adjusting member can be selectively placed against each abutting face so that the position adjustment can be performed appropriately. In addition, it becomes possible to mold the optical element having the position-adjusting concave part by using only two molding dies, i.e. a molding die for molding the part on the first groove side and a molding die for molding the part on the second groove side. Further, the molded optical element can be surely taken out from the molding die.

The optical element according to a fifth aspect is an optical element having a position-adjusting concave part that is caved towards an optical axis side on an outer peripheral face surrounding the optical axis, which is capable of adjusting position by inserting an adjusting member into the position-adjusting concave part and shifting the adjusting member in that state. The optical element comprises: a first groove extending from one end of the outer peripheral face in an optical axis direction towards other end; a second groove extending from the other end of the outer peripheral face in the optical axis direction towards the one end, which is connected to the first groove; and the position-adjusting concave part formed in a connecting part between the first groove and the second groove, which is capable of adjusting position by the adjusting member in the optical axis direction, a revolving direction with the optical axis being a center, width direction of the first groove and the second groove, which is orthogonal to the optical axis, and in a synthesized direction that is a combination of at least two directions out of the directions, wherein: the first groove and the second groove are formed in such a manner that respective centers in width direction thereof come at a same position with respect to each other in the width direction; and out of two side faces in a width direction of a connecting part between the first groove and the second groove, at least one side face protrudes towards a center side in the width direction of the first and second grooves than side faces of the first and second groove which are connected to the one side face, thereby forming, in the connecting part, an abutting face to which the adjusting member can be placed against.

In the fifth aspect of the present invention, there is provided in the connecting part between the first groove and the second groove the position-adjusting concave part in which at least a part of side faces is formed by the abutting face. Thus, the adjusting member can be placed against the abutting face so that the position adjustment can be performed appropriately. In addition, it becomes possible to mold the optical element having the position-adjusting concave part by using only two molding dies, i.e. a molding die for molding the part on the first groove side and a molding die for molding the part on the second groove side. Further, the molded optical element can be surely taken out from the molding die.

Moreover, the optical element holder according to a sixth aspect is an optical element holder for holding an optical element, having a position-adjusting concave part on an outer peripheral face surrounding an optical axis of the optical element, which is capable of adjusting position of the optical element by inserting an adjusting member into the position-adjusting concave part and shifting the adjusting member while holding the optical element. The optical element holder comprises: a first groove extending from one end of the outer peripheral face in an optical axis direction towards other end, and a second groove connected to the first groove, which extends from the other end of the outer peripheral face in the optical axis direction towards the one end; and the position-adjusting concave part formed in a connecting part between the first groove and the second groove, which is capable of adjusting position by the adjusting member in the optical axis direction of the optical element, a revolving direction with the optical axis being a center, width direction of the first groove and the second groove, which is orthogonal to the optical axis direction, and in a synthesized direction that is a combination of at least two directions out of the directions, wherein the optical element holder can be molded by using only two molding dies of a first molding die for molding a part on the first groove side and a second molding die for molding a part on the second groove side.

In the sixth aspect of the present invention, there is provided the position-adjusting concave part in the connecting part between the first groove and the second groove. Thus, it is possible to mold the optical element holder having the position-adjusting concave part by using only two molding dies of the first molding die and the second molding die. In addition, the molded optical element holder (molded article) can be surely taken out from the molding die.

Further, the optical element holder according to a seventh aspect is an optical element holder for holding an optical element, having a position-adjusting concave part that is caved towards an optical axis side on an outer peripheral face surrounding the optical axis of the optical element, which is capable of adjusting position of the optical element by inserting an adjusting member into the position-adjusting concave part and shifting the adjusting member while holding the optical element. The optical element holder comprises: a first groove extending from one end of the outer peripheral face in an optical axis direction towards other end, which has at least a first bottom face, a first side face formed in one end of the first bottom face in a width direction orthogonal to the optical axis direction, and a second side face formed in other end of the first bottom face in the width direction; a second groove connected to the first groove, which extends from the other end of the outer peripheral face in the optical axis direction towards the one end, has at least a second bottom face, a third side face formed in one end of the second bottom face in the width direction, and a fourth side face formed in other end of the second bottom face in the width direction; and the position-adjusting concave part formed in a connecting part between the first groove and the second groove, which is capable of adjusting position by the adjusting member in the optical axis direction, a revolving direction with the optical axis being a center, width direction of the first groove and the second groove, which is orthogonal to the optical axis, and in a synthesized direction that is a combination of at least two directions out of the directions, wherein: the first side face is formed at a position closer to one direction side in the width direction than the third side face; the third side face is formed at a position closer to the one direction side in the width direction than the second side face or at a same position as that of the second side face in the width direction; the second side face is formed at a position closer to the one direction side in the width direction than the fourth side face; the connecting part between the first groove and the second groove comprises at least: in a vicinity of the second groove in the first side face, a first abutting face to which the adjusting member can be placed against, which is formed in such a shape that a nodal line between either the outer peripheral face or the first bottom face becomes in parallel to the optical axis direction or in such a shape that it gradually becomes distant from the optical axis towards the one end of the outer peripheral face in the optical axis direction; at an end of the first abutting face on the second groove side or in an vicinity of the end, a second abutting face to which the adjusting member can be place against, which is formed in a such a shape that a nodal line between at least either the outer peripheral face or the first bottom face makes a prescribed angle with respect to the optical axis direction by being extended from the end towards a center side of the first groove in the width direction; in a vicinity of the first groove in the fourth side face, a third abutting face to which the adjusting member can be placed against, which is formed in such a shape that a nodal line between either the outer peripheral face or the second bottom face becomes in parallel to the optical axis direction or in such a shape that it gradually becomes distant from the optical axis towards the other end of the outer peripheral face in the optical axis direction; and at an end of the third abutting face on the first groove side or in an vicinity of the end, a fourth abutting face to which the adjusting member can be place against, which is formed in a such a shape that a nodal line between at least either the outer peripheral face or the second bottom face makes a prescribed angle with respect to the optical axis direction by being extended from the end towards a center side of the second groove in the width direction, wherein the first to fourth abutting faces constitute at least a part of side faces of the position-adjusting concave part.

In the seventh aspect of the present invention, there is provided in the connecting part between the first groove and the second groove the position-adjusting concave part in which at least a part of side faces is formed by the first to fourth abutting faces. Thus, the adjusting member can be selectively placed against each abutting face so that the position adjustment of the optical element can be performed appropriately. In addition, it becomes possible to mold the optical element holder having the position-adjusting concave part by using only two molding dies, i.e. a molding die for molding the part on the first groove side and a molding die for molding the part on the second groove side. Further, the molded optical element holder can be surely taken out from the molding die.

Furthermore, the optical element holder according to an eighth aspect is the optical element holder according to the seventh aspect, wherein: the second abutting face is formed in such a shape that at least one of nodal lines between the outer peripheral face and the first bottom face is orthogonal to the optical axis direction; the fourth abutting face is formed in such a shape that at least one of nodal lines between the outer peripheral face and the second bottom face is orthogonal to the optical axis direction; and the position-adjusting concave part has a square or rectangular plane shape.

Further, the eighth aspect of the present invention allows the use of existing adjusting members. Moreover, the adjusting member can be appropriately placed against all the abutting faces so that position adjustment of the optical element can be performed more easily with higher precision.

The optical element holder according to a ninth aspect is an optical element holder for holding an optical element, having a position-adjusting concave part that is caved towards an optical axis side on an outer peripheral face surrounding the optical axis of the optical element, which is capable of adjusting position of the optical element by inserting an adjusting member into the position-adjusting concave part and shifting the adjusting member while holding the optical element. The optical element holder comprises: a first groove extending from one end of the outer peripheral face in an optical axis direction towards other end, which has at least a first bottom face, a first side face formed in one end of the first bottom face in a width direction orthogonal to the optical axis direction, and a second side face formed in other end of the first bottom face in the width direction; a second groove connected to the first groove, which extends from the other end of the outer peripheral face in the optical axis direction towards the one end, has at least a second bottom face, a third side face formed in one end of the second bottom face in the width direction, and a fourth side face formed in other end of the second bottom face in the width direction; and the position-adjusting concave part formed in a connecting part between the first groove and the second groove, which is capable of adjusting position by the adjusting member in the optical axis direction of the optical element, a revolving direction with the optical axis being a center, width direction of the first groove and the second groove, which is orthogonal to the optical axis, and in a synthesized direction that is a combination of at least two directions out of the directions, wherein: either the first side face and the third side face or the second side face and the fourth side face are formed at a same position in the width direction, or the first side face and the third side face as well as the second side face and the fourth side face are formed at a same position in the width direction; the connecting part between the first groove and the second groove comprises at least: in a vicinity of the second groove in the first side face, a first abutting face to which the adjusting member can be placed against, which is formed in such a shape that a nodal line between either the outer peripheral face or the first bottom face becomes in parallel to the optical axis direction or in such a shape that it gradually becomes distant from the optical axis towards the one end of the outer peripheral face in the optical axis direction; at an end of the first abutting face on the second groove side or in an vicinity of the end, a second abutting face to which the adjusting member can be place against, which is formed in a such a shape that a nodal line between at least either the outer peripheral face or the first bottom face makes a prescribed angle with respect to the optical axis direction by being extended from the end towards a center side of the first groove in the width direction; in a vicinity of the first groove in the fourth side face, a third abutting face to which the adjusting member can be placed against, which is formed in such a shape that a nodal line between either the outer peripheral face or the second bottom face becomes in parallel to the optical axis direction or in such a shape that it gradually becomes distant from the optical axis towards the other end of the outer peripheral face in the optical axis direction; and at an end of the third abutting face on the first groove side or in an vicinity of the end, a fourth abutting face to which the adjusting member can be place against, which is formed in a such a shape that a nodal line between at least either the outer peripheral face or the second bottom face makes a prescribed angle with respect to the optical axis direction by being extended from the end towards a center side of the second groove in the width direction, wherein the first to fourth abutting faces constitute at least a part of side faces of the position-adjusting concave part.

In the ninth aspect of the present invention, there is provided in the. connecting part between the first groove and the second groove the position-adjusting concave part in which at least a part of side faces is formed by the first to fourth abutting faces. Thus, the adjusting member can be selectively placed against each abutting face so that the position adjustment of the optical element can be performed appropriately. In addition, it becomes possible to mold the optical element holder having the position-adjusting concave part by using only two molding dies, i.e. a molding die for molding the part on the first groove side and a molding die for molding the part on the second groove side. Further, the molded optical element holder can be surely taken out from the molding die.

Moreover, the optical element holder according to a tenth aspect is an optical element holder for holding an optical element, having a position-adjusting concave part that is caved towards an optical axis side on an outer peripheral face surrounding the optical axis of the optical element, which is capable of adjusting position of the optical element by inserting an adjusting member into the position-adjusting concave part and shifting the adjusting member while holding the optical element. The optical element holder comprises: a first groove extending from one end of the outer peripheral face in an optical axis direction towards the other end; a second groove extending from the other end of the outer peripheral face in the optical axis direction towards the one end, which is connected to the first groove; and the position-adjusting concave part formed in a connecting part between the first groove and the second groove, which is capable of adjusting position by the adjusting member in the optical axis direction of the optical element, a revolving direction with the optical axis being a center, width direction of the first groove and the second groove, which is orthogonal to the optical axis, and in a synthesized direction that is a combination of at least two directions out of the directions, wherein: the first groove and the second groove are formed in such a manner that respective centers in width direction thereof come at a same position with respect to each other in the width direction; out of two side faces in a width direction of a connecting part between the first groove and the second groove, at least one side face protrudes towards a center side in the width direction of the first and second grooves than side faces of the first and second groove which are connected to the one side face, thereby forming, in the connecting part, an abutting face to which the adjusting member can be placed against; and the abutting face constitutes at least a part of side faces of the position-adjusting concave part.

In the tenth aspect of the present invention, there is provided in the connecting part between the first groove and the second groove the position-adjusting concave part in which at least a part of side faces is formed by the abutting face. Thus, the adjusting member can be placed against the abutting face so that the position adjustment can be performed appropriately. In addition, it becomes possible to mold the optical element holder having the position-adjusting concave part by using only two molding dies, i.e. a molding die for molding the part on the first groove side and a molding die for molding the part on the second groove side. Further, the molded optical element holder can be surely taken out from the molding die.

In the optical element according to the first aspect, there is provided the position-adjusting concave part in the connecting part between the first groove and the second groove. Thus, it is possible to mold the optical element having the position-adjusting concave part by using only two molding dies of the first molding die and the second molding die. In addition, the molded optical element can be surely taken out from the molding die. As a result, it is possible to achieve an optical element that is capable of: reducing the total cost for molding the position-adjusting concave part, e.g. cost of dies, cost for initially adopting an automation machine, cost necessary for modification or maintenance; molding the position-adjusting concave part effectively; and also improving the yield.

In the optical element according to the second aspect, there is provided in the connecting part between the first groove and the second groove the position-adjusting concave part in which at least a part of side faces is formed by the first to fourth abutting faces. Thus, the adjusting member can be selectively placed against each abutting face so that the position adjustment can be performed appropriately. In addition, it becomes possible to mold the optical element having the position-adjusting concave part by using only two molding dies, i.e. a molding die for molding the part on the first groove side and a molding die for molding the part on the second groove side. Further, the molded optical element can be surely taken out from the molding die. As a result, it is possible to achieve an optical element that is capable of: reducing the total cost for molding the position-adjusting concave part, e.g. cost of dies, cost for initially adopting an automation machine, cost necessary for modification or maintenance; molding the position-adjusting concave part effectively; improving the yield; and also exhibiting an excellent optical performance due to the appropriately-performed position adjustment.

Further, the optical element according to the third aspect allows the use of existing adjusting members. Moreover, the adjusting member can be appropriately placed against all the abutting faces so that position adjustment can be performed more easily with higher precision. As a result, in addition to the effects achieved by the optical element according to the second aspect, it is possible to provide an optical element capable of further improving the manufacture efficiency and the optical performance of an optical apparatus to which the optical element is mounted.

Furthermore, in the optical element according to the fourth aspect, there is provided in the connecting part between the first groove and the second groove the position-adjusting concave part in which at least a part of side faces is formed by the first to fourth abutting faces. Thus, the adjusting member can be selectively placed against each abutting face so that the position adjustment can be performed appropriately. In addition, it becomes possible to mold the optical element having the position-adjusting concave part by using only two molding dies, i.e. a molding die for molding the part on the first groove side and a molding die for molding the part on the second groove side. Further, the molded optical element can be surely taken out from the molding die. As a result, it is possible to achieve an optical element that is capable of: reducing the total cost for molding the position-adjusting concave part, e.g. cost of dies, cost for initially adopting an automation machine, cost necessary for modification or maintenance; molding the position-adjusting concave part effectively; improving the yield; and also exhibiting an excellent optical performance due to the appropriately-performed position adjustment.

In the optical element according to the fifth aspect, there is provided in the connecting part between the first groove and the second groove the position-adjusting concave part in which at least a part of side faces is formed by the abutting face. Thus, the adjusting member can be placed against the abutting face so that the position adjustment can be performed appropriately. In addition, it becomes possible to mold the optical element having the position-adjusting concave part by using only two molding dies, i.e. a molding die for molding the part on the first groove side and a molding die for molding the part on the second groove side. Further, the molded optical element can be surely taken out from the molding die. As a result, it is possible to achieve an optical element that is capable of: reducing the total cost for molding the position-adjusting concave part, e.g. cost of dies, cost for initially adopting an automation machine, cost necessary for modification or maintenance; molding the position-adjusting concave part effectively; improving the yield; and also exhibiting an excellent optical performance due to the appropriately-performed position adjustment.

Further, in the optical element holder according to the sixth aspect, there is provided the position-adjusting concave part in the connecting part between the first groove and the second groove. Thus, it is possible to mold the optical element having the position-adjusting concave part by using only two molding dies of the first molding die and the second molding die. In addition, the molded optical element holder can be surely taken out from the molding die. As a result, it is possible to achieve an optical element holder that is capable of: reducing the total cost for molding the position-adjusting concave part, e.g. cost of dies, cost for initially adopting an automation machine, cost necessary for modification or maintenance; molding the position-adjusting concave part effectively; and also improving the yield.

Furthermore, in the optical element holder according to the seventh aspect, there is provided in the connecting part between the first groove and the second groove the position-adjusting concave part in which at least a part of side faces is formed by the first to fourth abutting faces. Thus, the adjusting member can be selectively placed against each abutting face so that the position adjustment can be performed appropriately. In addition, it becomes possible to mold the optical element holder having the position-adjusting concave part by using only two molding dies, i.e. a molding die for molding the part on the first groove side and a molding die for molding the part on the second groove side. Further, the molded optical element holder can be surely taken out from the molding die. As a result, it is possible to achieve an optical element holder that is capable of: reducing the total cost for molding the position-adjusting concave part, e.g. cost of dies, cost for initially adopting an automation machine, cost necessary for modification or maintenance; molding the position-adjusting concave part effectively; improving the yield; and also exhibiting an excellent optical performance due to the appropriately-performed position adjustment.

Further, the optical element holder according to the eighth aspect allows the use of existing adjusting members. Moreover, the adjusting member can be appropriately placed against all the abutting faces so that position adjustment of the optical element can be performed more easily with higher precision. As a result, in addition to the effects achieved by the optical element holder according to the seventh aspect, it is possible to provide an optical element holder capable of further improving the manufacture efficiency and the optical performance of an optical apparatus to which the optical element is mounted.

Furthermore, in the optical element holder according to the ninth aspect, there is provided in the connecting part between the first groove and the second groove the position-adjusting concave part in which at least a part of side faces is formed by the first to fourth abutting faces. Thus, the adjusting member can be selectively placed against each abutting face so that the position adjustment of the optical element can be performed appropriately. In addition, it becomes possible to mold the optical element holder having the position-adjusting concave part by using only two molding dies, i.e. a molding die for molding the part on the first groove side and a molding die for molding the part on the second groove side. Further, the molded optical element holder can be surely taken out from the molding die. As a result, it is possible to achieve an optical element holder that is capable of: reducing the total cost for molding the position-adjusting concave part, e.g. cost of dies, cost for initially adopting an automation machine, cost necessary for modification or maintenance; molding the position-adjusting concave part effectively; improving the yield; and also exhibiting an excellent optical performance due to the appropriately-performed position adjustment.

Moreover, in the optical element according to the tenth aspect, there is provided in the connecting part between the first groove and the second groove the position-adjusting concave part in which at least a part of side faces is formed by the abutting face. Thus, the adjusting member can be placed against the abutting face so that the position adjustment of the optical element can be performed appropriately. In addition, it becomes possible to mold the optical element holder having the position-adjusting concave part by using only two molding dies, i.e. a molding die for molding the part on the first groove side and a molding die for molding the part on the second groove side. Further, the molded optical element holder can be surely taken out from the molding die. As a result, it is possible to achieve an optical element holder that is capable of: reducing the total cost for molding the position-adjusting concave part, e.g. cost of dies, cost for initially adopting an automation machine, cost necessary for modification or maintenance; molding the position-adjusting concave part effectively; improving the yield; and also exhibiting an excellent optical performance due to the appropriately-performed position adjustment.

DETAILED DESCRIPTION OF THE PREFERRED EMBODIMENTS

Embodiment of Optical Element

First Embodiment

Figure 1:
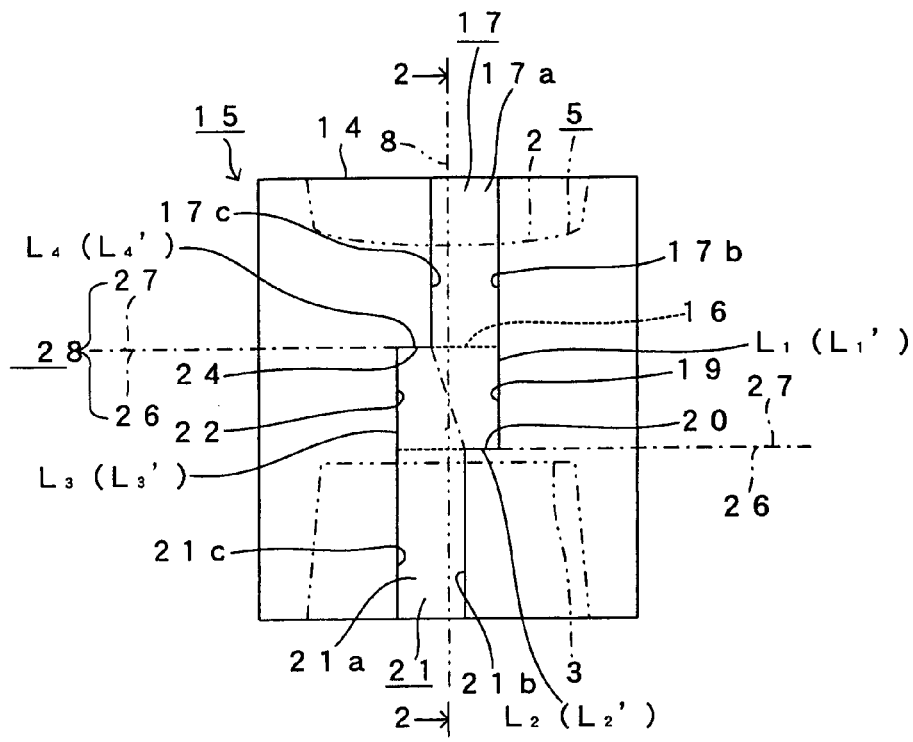
FIG. 1 is a front elevational view for showing a lens with a molded position-adjusting concave part together with a molding die according to a first embodiment of an optical element of the present invention.

A first embodiment of the optical element according to the present invention will be described hereinafter by referring to FIG. 1 and FIG. 2.

Same reference numerals as those of the conventional case are applied for describing the components having the same or similar fundamental structures thereof.

Figure 2:
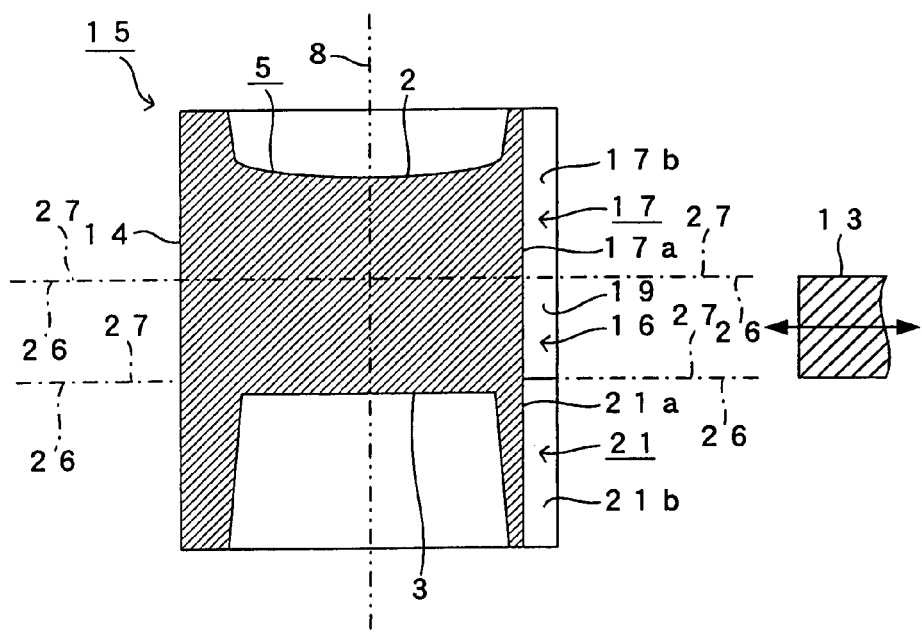
FIG. 2 is a cross section taken along the line 2-2 of FIG. 1 for showing the lens of FIG. 1 together with an adjusting pin.

As an example of the optical element according to the embodiment, FIG. 1 and FIG. 2 illustrate a lens 15 with an integrally molded holder, which is formed by integrally molding a lens main body 5 comprising two lens faces 2, 3, i.e. a first lens face (cylindrical face) 2 and a second lens 3, and a cylindrical-shape holder 14 for holding the lens main body 5 through injection molding of a resin material.

This lens 15 can be used as a sensor lens that is disposed at an incident-side position of a light-receiving element in an optical pickup device (see FIG. 9), for example.

As shown in FIG. 1 and FIG. 2, the lens 15 of the embodiment comprises, on the outer peripheral face of the holder 14, a position-adjusting concave part 16 that is a part surrounded by a virtual line (broken line) in FIG. 1. The position-adjusting concave part 16 is formed to have a flat bottom face.

By inserting an adjusting pin 13 as an example of an adjusting member into the position-adjusting concave part 16 and shifting the adjusting pin 13 in that state, the position of the lens 15 can be adjusted.

Specifically, by shifting the adjusting pin 13 in the direction of an optical axis 8 of the lens 15 (in the vertical direction of FIG. 1 and FIG. 2) with the adjusting pin 13 inserted in the position-adjusting concave part 16, it is possible to adjust the position of the lens 15 in the optical axis 8 direction.

Further, by rotating the adjusting pin 13 in the revolving direction having the optical axis 8 being the center while the adjusting pin 13 is inserted in the position-adjusting concave part 16, it is possible to adjust the position of the lens 15 in the revolving direction.

Furthermore, by shifting the adjusting pin 13 in the width direction of the position-adjusting concave part 16 (in the lateral direction of FIG. 1) that is orthogonal to the optical axis 8 while the adjusting pin 13 is inserted in the position-adjusting concave part 16, it is possible to adjust the position of the lens 15 in the width direction.

The width direction of the position-adjusting concave part 16 means the same direction (in the lateral direction of FIG. 1) as the width direction of a connecting part between a first groove 17 and a second groove 21 to be described later, the width direction of a first bottom face 17a of the first groove 17, and the width direction of a second bottom face 21a of the second groove 21.

Moreover, by shifting the adjusting pin 13 in a synthesized direction of at least two directions among the optical axis 8 direction, the revolving direction, and the width direction under the state where the adjusting pin 13 is inserted in the position-adjusting concave part 16, it becomes possible to adjust the position of the lens 15 in the synthesized direction.

In terms of the fact that position adjustment of the lens 15 is performed by shifting the adjusting pin 13 while the adjusting pin 13 is inserted in the position-adjusting concave part 16, it is basically the same as the conventional case. However, the embodiment is very different from the conventional case in terms of the structure of the position-adjusting concave part 16.

That is, as shown in FIG. 1, on the outer peripheral face of the holder 14, there is formed the first groove 17 extending from one of the ends (the top end in FIG. 1 and FIG. 2) in the optical axis 8 direction on the outer peripheral face towards the other end (the bottom end in FIG. 1 and FIG. 2) in the optical axis 8 direction thereof.

As shown in FIG. 1 and FIG. 2, the first groove 17 has the bottom face 17a that is lengthy in the optical axis 8 direction.

Further, the first groove 17 has a first side face 17b formed on one end of the first bottom face 17a in the width direction that is orthogonal to the optical axis 8 direction, i.e. in the right end of the first bottom face 17a in FIG. 1.

Furthermore, the first groove 17 has a second side face 17c formed on the other end of the first bottom face 17a in the width direction, i.e. in the left end of the first bottom face 17a in FIG. 1. This second side face 17c is formed to have a shorter length in the optical axis 8 direction than that of the first side face 17b.

Meanwhile, as shown in FIG. 1, on the outer peripheral face of the holder 14, there is formed the second groove 21 extending from the other end (the bottom end) in the optical axis 8 direction on the outer peripheral face towards the one end (the top end) in the optical axis 8 direction thereof. The top end of this second groove 21 is connected to the bottom end of the first groove 17.

As shown in FIG. 1 and FIG. 2, the second groove 21 has the bottom face 21a that is lengthy in the optical axis 8 direction.

Further, the second groove 21 has a third side face 21b formed on one end of the second bottom face 21a in the width direction that is orthogonal to the optical axis 8 direction, i.e. in the right end of the second bottom face 21a in FIG. 1.

As shown in FIG. 1, the third side face 21b is formed at a position that is on the left side with respect to the first side face 17b in the width direction and on the right side with respect to the second side face 17c in the width direction. In other words, the third side face 21b is formed between the first side face 17b and the second side face 17c in the width direction. The third side face 21b may be formed at the same position as that of the second side face 17c in the width direction.

Furthermore, the second groove 21 has a fourth side face 21c formed on the other end of the second bottom face 21a in the width direction, i.e. in the left end of the second bottom face 21a in FIG. 1. This fourth side face 21c is formed to have a longer length in the optical axis 8 direction than that of the third side face 21b.

The fourth side face 21c is formed at a position on the left of the second side face 17c in the width direction.

The embodiment has the above-described position-adjusting concave part 16 in the connecting part between the first groove 17 and the second groove 21.

The connecting part between the first groove 17 and the second groove 21 will be described in more detail. This connecting part has a first abutting face 19 on the second side face 17b in the vicinity of the second groove 21, and a nodal line $L_1$ between the outer peripheral face of the holder 14 and a nodal line$_1$' between the first bottom face 17a are in parallel to the optical axis 8 direction. The adjusting pin 13 can be placed against the first abutting face 19.

Further, the two nodal lines $L_1$ and $L_1$' of the first abutting face 19 overlap with each other on a plane of FIG. 1 and, as a whole, the first abutting face 19 is formed in a shape that is orthogonal to the bottom face of the position-adjusting concave part 16.

As the first abutting face 19, at least either the nodal line $L_1$ between the outer peripheral face of the holder 14 or the nodal line $L_1$' between the first bottom face 17a may be in parallel to the optical axis 8 direction, as long as it can have the adjusting pin 13 placed against at the time of position adjustment.

Further, the first abutting face 19 is not limited to the one in which at least one of the two nodal lines $L_1$ and $L_1$' is in parallel to the optical axis 8 direction. It is also possible to use the one in which at least one of the two nodal lines $L_1$ and $L_1$' gradually goes distant from the optical axis 8 towards the top end of the outer peripheral face of the holder 14. Such shape of the first abutting face 19 is employed assuming the case of forming a mold draft taper on the first groove 17 and the case of providing an intentional taper on the first groove 17, for example.

Furthermore, the shape of the first abutting face 19 is not limited to the shape that is orthogonal to the bottom face of the position-adjusting concave part 16. For example, it may be formed in a shape that is oblique towards the inner side or outer side in the width direction of the position-adjusting concave part 16 along the depth direction of the position-adjusting concave part 16.

In addition to such first abutting face 19, the connecting part further comprises a second abutting face 20 formed at the end of the first abutting face 19 on the second groove 21 side. The adjusting pin 13 can be placed against the second abutting face 20.

The second abutting face 20 extends from the end of the first abutting face 19 on the second groove 21 side towards the center of the first groove 17 in the width direction at a right angle, so that it is formed in a shape in which a nodal line $L_2$ between the outer peripheral face of the holder 14 and a nodal line $L_2$' between the first bottom face 17a are orthogonal to the optical axis 8.

Further, the two nodal lines $L_2$ and $L_2$' of the second abutting face 20 overlap with each other on a plane of FIG. 1 and, as a whole, the second abutting face 20 is formed in a shape that is orthogonal to the bottom face of the position-adjusting concave part 16.

The end of the second abutting face 20 on the second groove 21 side, i.e. the left end in FIG. 1, is connected to the third side face 21b.

As the second abutting face 20, at least either the nodal line $L_2$ between the outer peripheral face of the holder 14 or the nodal line $L_2$' between the first bottom face 17a may be in parallel to the optical axis 8 direction, as long as it can have the adjusting pin 13 placed against at the time of position adjustment.

Furthermore, the shape of the second abutting face 20 is not limited to the shape that is orthogonal to the bottom face of the position-adjusting concave part 16. For example, it may be formed in a shape that is oblique towards the inner side or outer side in the width direction of the position-adjusting concave part 16 along the depth direction of the position-adjusting concave part 16.

In addition to such first abutting face 19 and second abutting face 20, the connecting part further comprises a third abutting face 22 formed on the fourth side face 21c in the vicinity of the first groove 17, and a nodal line $L_3$ between the outer peripheral face of the holder 14 and a nodal line $L_3$' between the second bottom face 21a are in parallel to the optical axis 8 direction. The adjusting pin 13 can be placed against the third abutting face 22.

Further, the two nodal lines $L_3$ and $L_3$' of the third abutting face 22 overlap with each other on a plane of FIG. 1 and, as a whole, the third abutting face 22 is formed in a shape that is orthogonal to the bottom face of the position-adjusting concave part 16.

As the third abutting face 22, at least either the nodal line $L_3$ between the outer peripheral face of the holder 14 or the nodal line $L_3$' between the second bottom face 21a may be in parallel to the optical axis 8 direction, as long as it can have the adjusting pin 13 placed against at the time of position adjustment.

Further, the third abutting face 22 is not limited to the one in which at least one of the two nodal lines $L_3$ and $L_3$' is in parallel to the optical axis 8 direction. It is also possible to use the one in which at least one of the two nodal lines $L_3$ and $L_3$' gradually goes distant from the optical axis 8 towards the bottom end of the outer peripheral face of the holder 14. Such shape of the third abutting face 22 is employed assuming the case of forming a mold draft taper on the second groove 21 and the case of providing an intentional taper on the second groove 21, for example.

Furthermore, the shape of the third abutting face 22 is not limited to the shape that is orthogonal to the bottom face of the position-adjusting concave part 16. For example, it may be formed in a shape that is oblique towards the inner side or outer side in the width direction of the position-adjusting concave part 16 along the depth direction of the position-adjusting concave part 16.

In addition to the first to third abutting faces 19, 20, 22, the connecting part further comprises a fourth abutting face 24 formed at the end of the third abutting face 22 on the first groove 17 side. The adjusting pin 13 can be placed against the fourth abutting face 24.

The fourth abutting face 24 extends from the end of the third abutting face 22 on the first groove 17 side towards the center of the second groove 21 in the width direction at a right angle, so that it is formed in a shape in which a nodal line $L_4$ between the outer peripheral face of the holder 14 and a nodal line $L_4'$ between the second bottom face 21a are orthogonal to the optical axis 8.

Further, the two nodal lines $L_4$ and $L_4'$ of the fourth abutting face 24 overlap with each other on a plane of FIG. 1 and, as a whole, the fourth abutting face 24 is formed in a shape that is orthogonal to the bottom face of the position-adjusting concave part 16.

Furthermore, the end of the fourth abutting face 24 on the first groove 17 side, i.e. the right end in FIG. 1, is connected to the second side face 17c.

As the fourth abutting face 24, at least either the nodal line $L_4$ between the outer peripheral face of the holder 14 or the nodal line $L_4'$ between the second bottom face 21a may be in parallel to the optical axis 8 direction, as long as it can have the adjusting pin 13 placed against at the time of position adjustment.

Moreover, the shape of the fourth abutting face 24 is not limited to the shape that is orthogonal to the bottom face of the position-adjusting concave part 16. For example, it may be formed in a shape that is oblique towards the inner side or outer side in the width direction of the position-adjusting concave part 16 along the depth direction of the position-adjusting concave part 16.

The first to fourth abutting faces 19, 20, 22, and 24 formed in this manner in the connecting part constitute the side faces of the position-adjusting concave part 16 having a square plane shape.

The first abutting face 19 and the third abutting face 22 each form the whole part of a different side face of the position-adjusting concave part 16 (on the left- and right-side faces in FIG. 1).

In the meantime, the second abutting face 20 and the fourth abutting face 24 each form a part of a different side face of the position-adjusting concave part 16 (the top- and bottom-side faces in FIG. 1).

The lens 15 having such position-adjusting concave part 16 can be molded by a lens molding die 28 which comprises only two molding dies 26 and 27 as shown by an alternate long and short dash line in FIG. 1 and FIG. 2. The lower die 26 is a movable-side molding die for molding the part on the first groove 17 side along with the first lens face 2 by transcription, and the upper die 27 is a fixed-side molding die for molding the part on the second groove 21 side along with the second lens face 3 by transcription.

That is, the embodiment is different from the conventional case in respect that the position-adjusting concave part 16 is molded in the connecting part between the first groove 17 and the second groove 21 which are in the shapes that do not interrupt the shift of the die (the lower die 26 in this embodiment) or the molded article in the optical axis 8 direction. (in other word, taking-out action of the molded article). Thus, the molded article can be surely taken out from the molding dies 26 and 27 even when the position-adjusting concave part 16 is molded by only the two molding dies 26 and 27.

Therefore, when shifting the adjusting pin 13 in the optical axis 8 direction, the revolving direction, the width direction, or the synthesized direction that is a combination of at least two directions among those directions, while the adjusting pin 13 is inserted to the position-adjusting concave part 16 of the lens 15 molded in this manner, the adjusting pin 13 can selectively be placed at least against one of the first to fourth abutting faces 19, 20, 22, and 24.

As a result, adjustment of the position of the lens 15 using the adjusting pin 13 can be appropriately performed.

Further, as described above, the plane shape of the position-adjusting concave part 16 is formed in a square shape in this embodiment. Thus, for adjusting the position, it is possible to use an existing pin without having a particular shape (for example, the one with a circular cross section) as it is by inserting it to the position-adjusting concave part 16.

Furthermore, the adjusting pin can be appropriately placed against all the abutting faces 19, 20, 22, and 24.

As a result, position adjustment of the lens 15 using the adjusting pin 13 can be performed with high precision and at a still lower cost.

The first to fourth abutting faces 19, 20, 22, and 24 may not necessarily be the flat faces but may be formed in winding or zigzag form along the depth direction of the position-adjusting concave part 16, for example, as long as they can have the adjusting pin 13 placed against when adjusting the position.

Needless to say, the position-adjusting concave part 16 of the embodiment can be applied to the diffraction grating.

Second Embodiment

Next, a second embodiment of the optical element according to the present invention will be described by referring to FIG. 3 and FIG. 4.

Same reference numerals as those of the first embodiment are applied for describing the components having the same or similar fundamental structures thereof.

Figure 3:
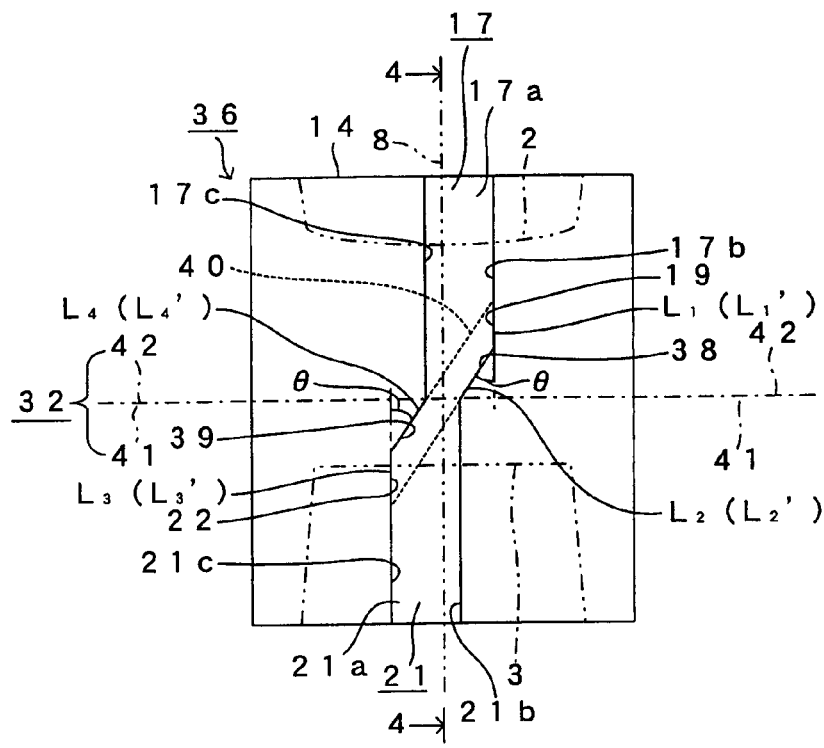
FIG. 3 is a front elevational view for showing a lens with a molded position-adjusting concave part together with a molding die according to a second embodiment of an optical element of the present invention.
Figure 4:
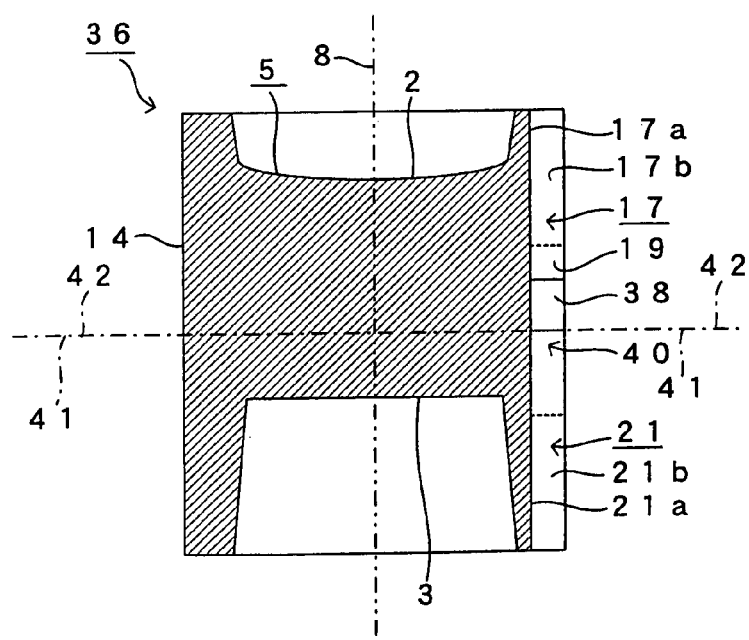
FIG. 4 is a cross section taken along the line 4-4 of FIG. 3.

As shown in FIG. 3 and FIG. 4, a lens 36 as the optical element of this embodiment is different form the lens 15 of the first embodiment, and the second side face 17c is formed to have a longer length than that of the first side face 17b in the optical axis 8 direction.

Further, unlike the lens 15 of the first embodiment, the lens 36 of this embodiment is so formed that the third side face 21b has a longer length than that of the fourth side face 21c in the optical axis 8 direction.

Furthermore, in the embodiment, a second abutting face 38 is not in the shape in which the nodal line $L_2$ between the outer peripheral face of the holder 14 and the nodal line $L_2'$ between the first bottom face 17a are orthogonal to the optical axis 8 direction, unlike the first embodiment. It is formed in a shape having a prescribed acute angle θ with respect to the optical axis 8 clockwise.

As the second abutting face 38, at least either the nodal line $L_2$ between the outer peripheral face of the holder 14 or the nodal line $L_2'$ between the first bottom face 17a may have the prescribed acute angle θ with respect to the optical axis 8 direction, as long as it can have the adjusting pin 13 placed against at the time of position adjustment.

The end of the second abutting face 38 on the second groove 21 side is placed at the same height as that of the end of the second side face 17c on the second groove 21 side.

Further, in the embodiment, a fourth abutting face 39 is not in the shape in which the nodal line $L_4$ between the outer peripheral face of the holder 14 and the nodal line $L_4'$ between the second bottom face 21a are orthogonal to the optical axis 8 direction, unlike the first embodiment. It is formed in a shape having a prescribed acute angle θ with respect to the optical axis 8 clockwise.

As the fourth abutting face 39, at least either the nodal line $L_4$ between the outer peripheral face of the holder 14 or the nodal line $L_4'$ between the second bottom face 21a may have the prescribed acute angle θ with respect to the optical axis 8 direction, as long as it can have the adjusting pin 13 placed against at the time of position adjustment.

Since the second abutting face 38 and the fourth abutting face 39 are formed in this manner, the plane shape of a position-adjusting concave part 40 in the lens 36 according to the embodiment is in a parallelogram shape as shown in FIG. 3.

Such lens 36 requires an adjusting pin in a shape that can be inserted into the position-adjusting concave part 40. However, like the first embodiment, it can be molded by a lens molding die 32 that is constituted only of two molding dies, i.e. a lower die 41 and an upper die 42, and a molded article can be surely taken out from the molding die 32.

Furthermore, in the embodiment, as shown by an alternate long and short dash line in FIG. 3 and FIG. 4, the contact face of the lower die 41 between the upper die 42 and the contact face of the upper die 42 between the lower die 41 can both be formed in a plane form without steps in the optical axis 8 direction. This allows an easy and low-cost manufacture of the optical element molding die.

The second abutting face 38 and the fourth abutting face 40 may not necessarily be the flat faces but may be formed in winding or zigzag form along the depth direction of the position-adjusting concave part 40, for example, as long as they can have the adjusting pin 13 placed against when adjusting the position.

Needless to say, the position-adjusting concave part 40 of the embodiment can be applied to the diffraction grating.

Third Embodiment

Next, a third embodiment of the optical element according to the present invention will be described by referring to FIG. 5.

Same reference numerals as those of the first embodiment are applied for describing the components having the same or similar fundamental thereof.

Figure 5:
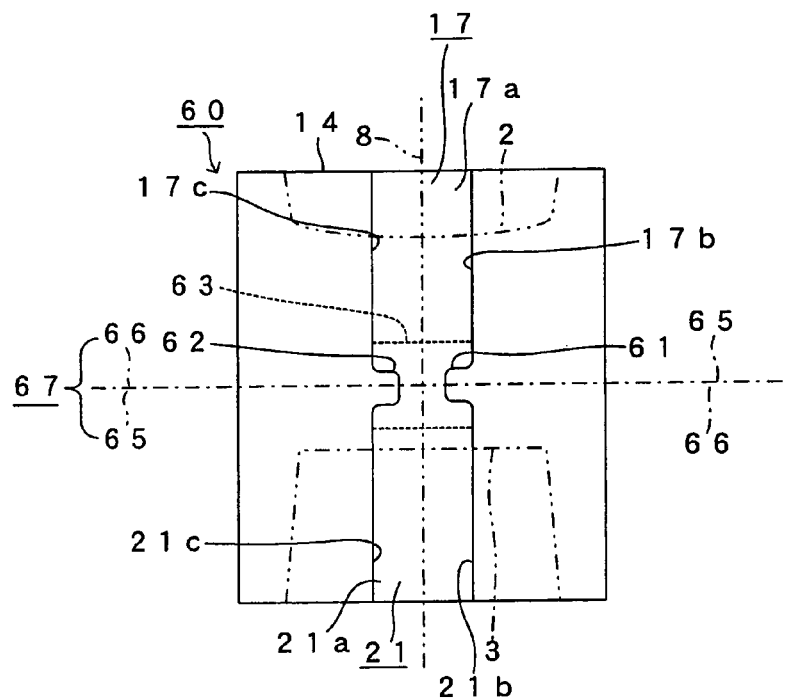
FIG. 5 is a front elevational view for showing a lens with a molded position-adjusting concave part together with a molding die according to a third embodiment of an optical element of the present invention.

As shown in FIG. 5, a lens 60 according to this embodiment is different from the lens 15 of the first embodiment. The first groove 17 and the second groove 21 thereof are formed in such a manner that each center of the grooves in the width direction comes at the same position with respect to each other in the width direction and that the dimensions thereof in the width direction are the same.

Further, both side faces in the width direction of the connecting part between the first groove 17 and the second groove 21, i.e. the connecting part between the first side face 17b and the third side face 21b, and the connecting part between the second side face 17c and the fourth side face 21c, are formed to protrude towards the center side in the width direction of the first groove 17 and the second groove 21 when compared to the side faces of the part other than the connecting part.

Specifically, out of these two protruded side faces of the connecting part, the side face on the right side of FIG. 5 has: a first face orthogonal to the first side face 17b, which is connected to the first side face 17b via a rounded face; a second face in parallel to the first side face 17b, which is connected to the left end of the first face via the rounded face; and a third face that is connected to the bottom end of the second face via the rounded face while the right end thereof is connected to the third side face 21b via the rounded face. Thereby, the plane shape thereof is formed almost in a rectangular shape.

Further, out of these two side faces of the connecting part, the side face on the left side of FIG. 5 has: a first face orthogonal to the second side face 17c, which is connected to the second side face 17c via a rounded face; a second face in parallel to the second side face 17c, which is connected to the right end of the first face via the rounded face; and a third face that is connected to the bottom end of the second face via the rounded face while the left end thereof is connected to the fourth side face 21c via the rounded face. Thereby, the plane shape thereof is formed almost in a rectangular shape.

Thereby, both of the protruded side faces of the connecting part constitute abutting faces 61 and 62 to which the adjusting pin 13 can be placed against when adjusting the position.

Further, the abutting faces 61 and 62 constitute the side faces of a position-adjusting concave part 63 that is surrounded by a virtual line (broken line) in FIG. 5.

As shown by an alternate long and short dash line in FIG. 5, the lens 60 of the embodiment also can be molded by a lens molding die 67 that is constituted only of two molding dies 65, 66, i.e. a lower die 65 for molding the part on the first groove 17 side and an upper die 66 for molding the part on the second groove 21 side, and a molded article can be surely taken out from the molding die 67.

Furthermore, like the lens 36 of the second embodiment, the contact face of the lower die 65 between the upper die 66 and the contact face of the upper die 66 between the lower die 65 can both be formed in a plane form without steps in the optical axis 8 direction. This allows an easy and low-cost manufacture of the lens molding die 67.

In FIG. 5, the plane shapes of the abutting faces 61 and 62 are formed almost in rectangular. However, it is not limited to this but the abutting face may be formed in such a manner that the side faces of the connecting part are protruded in plane semicircle or plane triangle shape, so that the plane shape of the abutting face may be in other shapes than a rectangle, such as semicircle, triangle, etc.

Furthermore, only one of the side faces in the width direction of the connecting part may be protruded towards the center side in the width direction of the first groove 17 and the second groove 21. In that case, it is also possible to mold the abutting face against which the adjusting pin can be placed.

Needless to say, the position-adjusting concave part 63 of the embodiment can be applied to the diffraction grating.

Fourth Embodiment

Next, a fourth embodiment of the optical element according to the present invention will be described by referring to FIG. 6.

Same reference numerals as those of the second embodiment are applied for describing the components having the same or similar fundamental structures thereof.

Figure 6:
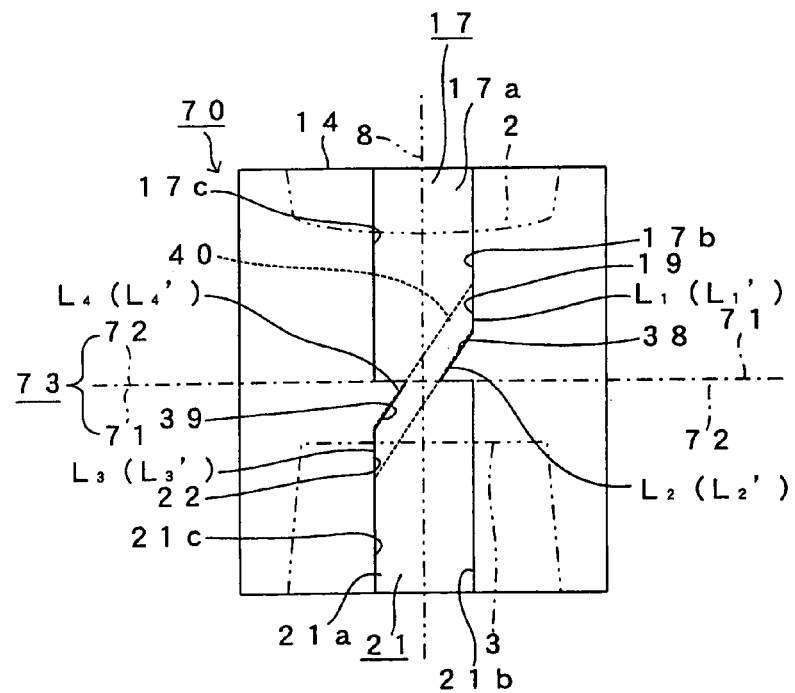
FIG. 6 is a front elevational view for showing a lens with a molded position-adjusting concave part together with a molding die according to a fourth embodiment of an optical element of the present invention.

As shown in FIG. 6, in a lens 70 of this embodiment, the forms of the first to fourth abutting faces 19, 38, 22, 39 and the form of the position-adjusting concave part 40 whose side faces are constituted of each of the abutting faces 19, 38, 22, 39 are basically the same as those of the lens 36 of the second embodiment.

However, unlike the lens 36 of the second embodiment, the lens 70 of this embodiment has the first side face 17b and the third face 21b formed at the same position in the width direction and the second side face 17c and the fourth side face 21c formed at the same position in the width direction.

As shown in an alternate long and short dash line in FIG. 6, the lens 70 of the embodiment also can be molded by a lens molding die 73 that is constituted only of two molding dies 71, 72, i.e. a lower die 71 for molding the part on the first groove 17 side and an upper die 72 for molding the part on the second groove 21 side, and a molded article can be surely taken out from the molding die 73.

Furthermore, like the lens 36 of the second embodiment, the contact face of the lower die 71 between the upper die 72 and the contact face of the upper die 72 between the lower die 71 can both be formed in a plane form without steps in the optical axis 8 direction. This allows an easy and low-cost manufacture of the lens molding die 73.

Embodiment of Optical Element Holder

Next, an embodiment of the optical element holder according to the present invention will be described by referring to FIG. 7 and FIG. 8.

Figure 7:
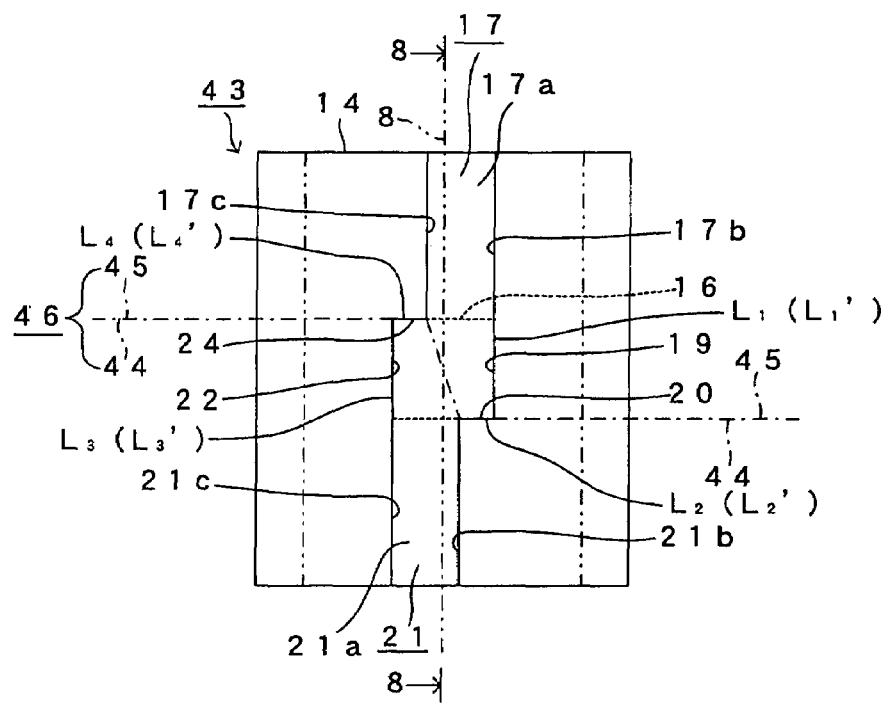
FIG. 7 is a front elevational view for showing an embodiment of an optical element holder according to the present invention.
Figure 8:
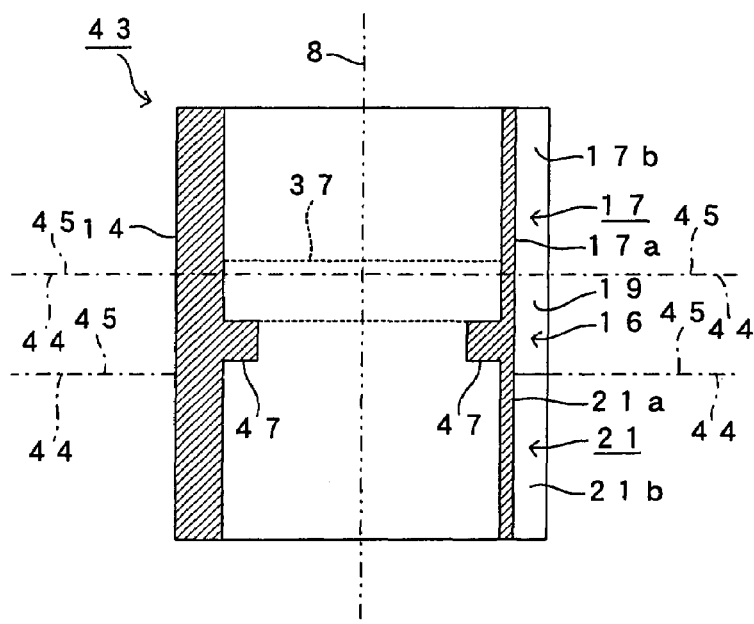
FIG. 8 is a cross section taken along the line 8-8 of FIG. 7.

As shown in FIG. 7, an optical element holder 43 according to this embodiment is formed as a cylindrical-shape holder 43.

The optical element holder 43 is formed by providing, in the inner peripheral face, a supporting part 47 for supporting an optical element 37 to be enclosed in the holder 43, in addition to the structure in which the lens main body 5 is eliminated from the lens 15 of the first embodiment or the structure in which the diffraction grating main body 31 is eliminated from the diffraction grating 30 of the second embodiment.

That is, in the outer peripheral face of the optical element holder 43 according to the embodiment, the above-described first groove 17 and the second groove 21 are formed, and the above-described position-adjusting concave part 16 is formed in the connecting part between the first groove 17 and the second groove 21.

Inside the optical element holder 43, for example, the optical element 37 as a separate body such as a lens and a diffraction grating can be placed to the supporting part 47 and fixed by a method using an adhesive or the like.

In the state where the optical element 37 is fixed to the optical element holder 43, the adjusting pin 13 is inserted into the position-adjusting concave part 16 and the adjusting pin 13 is shifted. With this, it is possible to perform position adjustment in the synthesized direction that is a combination of at least two directions among the optical axis 8 direction of the optical element, the revolving direction, and the width direction.

Like the lens 15 and the diffraction grating 30 described above, the position-adjusting concave part 16 of such optical element holder 43 is also molded in the connecting part between the first groove 17 and the second groove 21 which are in the shapes that do not interrupt the shift of the molding die or the molded article in the optical axis 8 direction. Therefore, it can be molded by an optical element holder molding die 46 that is constituted only of two molding dies such as a lower die 44 and an upper die 45 as shown by an alternate long and short dash line in FIG. 9. Also, the molded article can be surely taken out from the molding die 46.

Further, the position-adjusting concave part 16 is formed in a square shape in this embodiment. Thus, for adjusting the position, it is possible to use an existing pin as it is and the adjusting pin can be appropriately placed against all the abutting faces 19, 20, 22, and 24.

The position-adjusting concave part of the optical element holder is not limited to the above-described structure but may be formed in the structure equivalent to that shown in FIG. 3-FIG. 6. In that case, the optical element molding die can be manufactured more easily at a lower cost.

Embodiment of Optical Pickup Device

Figure 9:
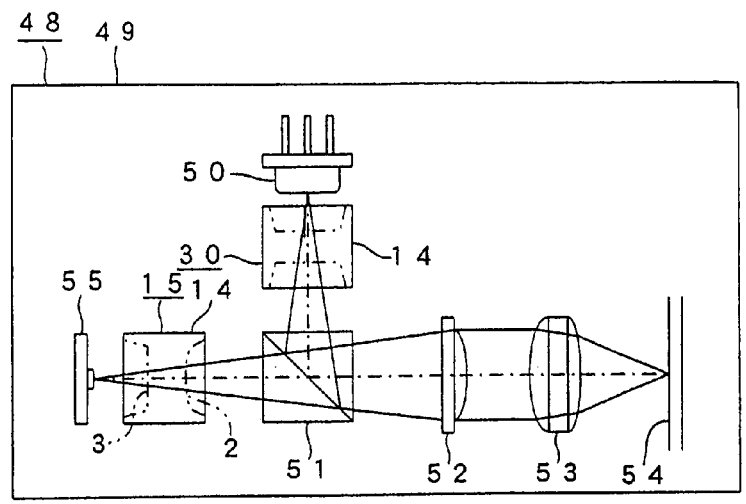
FIG. 9 is an illustration for showing the structure of an embodiment of an optical pickup device to which the optical element according to the present invention is mounted.
Figure 10:
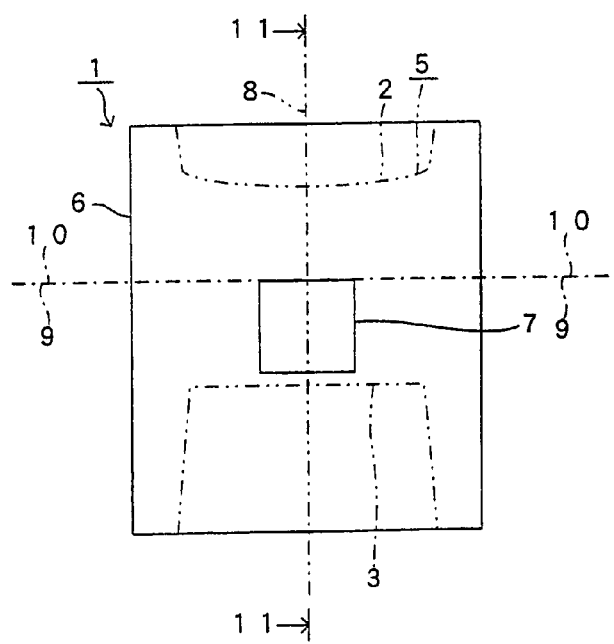
FIG. 10 is a front elevational view for showing an example of a lens in which a conventional position-adjusting concave is molded.
Figure 11:
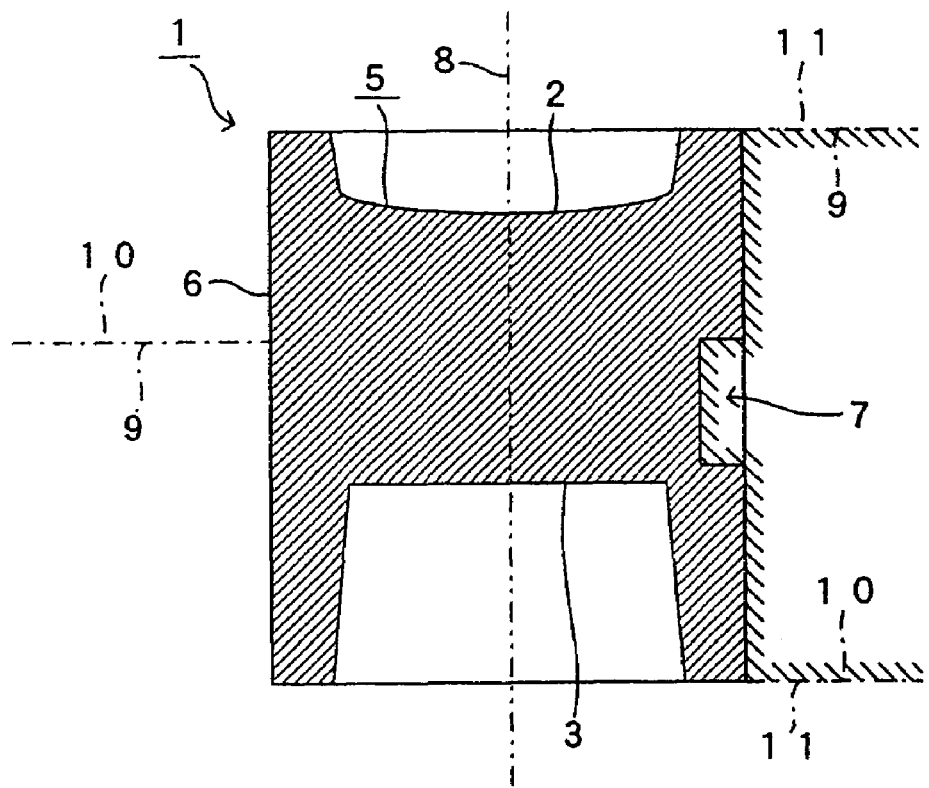
FIG. 11 is a cross section taken along the line 11-11 of FIG. 10.

By referring to FIG. 9, there is described an embodiment of the optical element device to which the optical element according to the present invention is mounted.

As shown in FIG. 9, an optical pickup device 48 according to this embodiment comprises an LED light source 50 as a light source within a frame 49. The LED light source 50 emits laser light of about 780 nm wavelength for reading out information recorded on a CD.

At a position on the light-emission side of the LED light source 50, there is provided the diffraction grating 30 having the position-adjusting concave part 16 molded on the outer peripheral face of the holder 14. The light emitted from the LED light source 50 makes incidence on the diffraction grating 30.

The diffraction grating 30 outputs the light making incidence from the LED light source 50 side by converting it into three beams (referred to as outward three beams hereinafter) for tracking.

A prism 51 is provided at a position on the emission side of the outward three beams of the diffraction grating 30. The outward three beams emitted from the diffraction grating 30 make incidence on the prism 51.

The prism 51 reflects the outward three beams making incidence from the diffraction grating 30 side towards the direction orthogonal to the incident direction.

A collimator lens 52 is provided at a position on the reflection side of the outward three beams of the prism 51. The outward three beams reflected by the prism 51 make incidence on the collimator lens 52.

The collimator lens 52 emits the outward three beams making incidence form the prism 51 side by converting them into parallel light beams.

An objective lens 53 is provided at a position on the emission side of the outward three beams of the collimator lens 52. The outward three beams emitted from the collimator lens 52 make incidence on the objective lens 53.

The objective lens 53 emits the outward three beams making incidence from the collimator lens 52 side by converting them into converged light.

A CD 54 is disposed at a position on the emission side of the outward three beams of the objective lens 53. The outward three beams emitted from the objective lens 53 side make incidence on a recording face of the CD 54.

The outward three beams making incidence on the recording face of the CD 54 obtain information recorded on the recording face by the intensity of the light reflected from the recording face and are reflected towards the objective lens 53 side.

Upon receiving the three beams (referred to as inward three beams hereinafter) emitted from the recording face of the CD 54, the objective lens 53 emits the inward three beams towards the collimator lens 52 side by converting them into the parallel light beams.

Upon receiving the inward three beams emitted from the objective lens 53, the collimator lens 52 emits the inward three beams towards the prism 51 side by converting them into the converged light.

When the inward three beams emitted from the collimator lens 52 makes incidence, the prism 51 transmits through the incident inwards three beams in that state.

At a position on the transmission side of the inward three beams of the prism 51, there is provided the sensor lens 15 having the position-adjusting concave part 16 of the above-described structure molded on the outer peripheral face of the holder 14. The inward three beams transmitted through the prism 51 make incidence on the sensor lens 15.

The sensor lens 15 gives astigmatism to the inward three beams making incidence from the prism 51 side, and also emits the inward three beams by converging (that is, condensing) the beams.

At a position on the emission side of the inward three beams of the sensor lens 15, a photodetector 55 as a light-receiving element is provided. The inward three beams emitted from the sensor lens 15 make incidence on the photodetector 55.

The photodetector 55 converts the incident inward three beams into electric signals.

The position-adjusting concave part 16 of the sensor lens 15 and that of the diffraction grating 30 are both molded in the connecting part between the first groove 17 and the second groove 21 which are in the shapes that do not interrupt the shift of the molding die or the molded article in the optical axis 8 direction. Also, they are molded by only two molding dies of the lower die 26 and the upper die 27.

At the time of assembling the optical pickup device 48, such sensor lens 15 and diffraction grating 30 are respectively fixed on the frame 49 after performing the position adjustments on the frame 49 in the optical axis 8 direction and revolving direction. Therefore, each can appropriately exhibit the function thereof.

With this, the optical pickup device 48 can properly read out the information recorded on the CD 54.

As described above, it is possible with the present invention to mold the lenses 15, 36, 60, 70, the diffraction grating 30, and the optical element holder 43, which comprise the position-adjusting concave parts 16, 40, 63, by using only two molding dies of the lower die such as 26, 41, 44, 65, or 71 and the upper die such as 27, 42, 45, 66, or 72. In addition, the molded article can be surely taken out from the molding die.

As a result, it is possible to reduce the total cost for molding the position-adjusting concave part, e.g. the cost of the dies, cost necessary for initially adopting automation machines, and cost for modifications or maintenance. At the same time, it allows an effective molding of the position-adjusting concave part and an improvement in the yield as well.

The present invention is not limited to the above-described embodiments but various modifications are possible as necessary.

For example, the number of abutting faces constituting the side faces of the position-adjusting concave part is not limited to four but may be five or more.

Further, not only the lens and the diffraction grating, but also other optical element that requires position adjustment in the optical axis direction and the revolving direction may be fixed in the optical element holder.

What is claimed is:

1. An optical element having a position-adjusting concave part that is caved towards an optical axis side on an outer peripheral face surrounding said optical axis, which is capable of adjusting position by inserting an adjusting member into said position-adjusting concave part and shifting said adjusting member in that state, said optical element comprising:

a first groove extending from one end of said outer peripheral face in an optical axis direction towards other end;

a second groove extending from said other end of said outer peripheral face in said optical axis direction towards said one end, which is connected to said first groove; and said position-adjusting concave part formed in a connecting part between said first groove and said second groove, which is capable of adjusting position by said adjusting member in said optical axis direction, a revolving direction with said optical axis being a center, width direction of said first groove and said second groove, which is orthogonal to said optical axis, and in a synthesized direction that is a combination of at least two directions out of said directions, wherein:

said first groove and said second groove are formed in such a manner that respective centers in width direction thereof come at a same position with respect to each other in said width direction;

out of two side faces in a width direction of a connecting part between said first groove and said second groove, at least one side face protrudes towards a center side in said width direction of said first and second grooves than side faces of said first and second groove which are connected to said one side face, thereby forming, in said connecting part, an abutting face to which said adjusting member can be placed against; and said abutting face constitutes at least a part of side faces of said position-adjusting concave part.

* * * * *